(12) United States Patent
Ariyoshi

(10) Patent No.: US 7,241,017 B2
(45) Date of Patent: Jul. 10, 2007

(54) IMAGE DISPLAY DEVICE

(75) Inventor: Shinya Ariyoshi, Tachikawa (JP)

(73) Assignee: Seiko Epson Corporation, Tokyo (JP)

( * ) Notice: Subject to any disclaimer, the term of this patent is extended or adjusted under 35 U.S.C. 154(b) by 312 days.

(21) Appl. No.: 11/030,884

(22) Filed: Jan. 10, 2005

(65) Prior Publication Data

US 2005/0151935 A1    Jul. 14, 2005

(30) Foreign Application Priority Data

Jan. 13, 2004    (JP) .............................. 2004-005482

(51) Int. Cl.
*G03B 21/14*    (2006.01)

(52) U.S. Cl. .................... 353/79; 248/922; 353/99; 353/82

(58) Field of Classification Search .................. 353/74, 353/77, 78, 79, 119, 98, 99, 82; 248/914, 248/919, 920, 921, 922, 923
See application file for complete search history.

(56) References Cited

U.S. PATENT DOCUMENTS

| | | | | |
|---|---|---|---|---|
| 3,623,802 A * | 11/1971 | Hubner | ........................ | 353/23 |
| 3,950,085 A * | 4/1976 | Grimm | ........................ | 353/44 |
| 5,580,146 A * | 12/1996 | Maslow | ........................ | 353/74 |
| 6,334,687 B1 * | 1/2002 | Chino et al. | .................. | 353/79 |
| 6,736,516 B1 * | 5/2004 | Francis Kepley et al. | .... | 353/79 |
| 6,783,247 B2 * | 8/2004 | White | .......................... | 353/79 |
| 7,021,771 B2 * | 4/2006 | Dwyer et al. | .................. | 353/79 |
| 7,025,466 B2 * | 4/2006 | Hoffmeister et al. | ........ | 353/119 |
| 7,063,424 B1 * | 6/2006 | Brinkman | ..................... | 353/74 |
| 2003/0081184 A1 * | 5/2003 | Li et al. | ........................ | 353/79 |
| 2005/0264768 A1 * | 12/2005 | Kondo et al. | ................. | 353/78 |

FOREIGN PATENT DOCUMENTS

| | | |
|---|---|---|
| EP | 0 860 737 A1 | 6/1998 |
| JP | A 04-298781 | 10/1992 |
| JP | A 08-256301 | 10/1996 |
| JP | A 09-154088 | 6/1997 |
| JP | A 2001-318610 | 11/2001 |
| JP | A 2003-513307 | 4/2003 |
| JP | A 2003-136892 | 5/2003 |
| JP | A 2005-010226 | 1/2005 |
| JP | A-2005-202128 | 7/2005 |
| JP | A-2006-047890 | 2/2006 |

* cited by examiner

*Primary Examiner*—William C. Dowling
(74) *Attorney, Agent, or Firm*—Oliff & Berridge, PLC

(57) ABSTRACT

Exemplary embodiments of the present invention provide an image display device having a functional design and accomplishing high quality and marketability to attract customers' attention. Exemplary embodiments include an independent installation type image display device including a display panel having a transmissive screen, a support frame for inclinedly supporting the display panel so that, when the image display device is erected on a horizontal floor, an angle defined between the display panel and the bottom surface is an acute angle, a projector placed below the display panel to project an image on the screen of the display panel, a storage unit which stores image data of an image to be projected and is mounted to the projector to output the corresponding image data to the projector, and an optical mechanism to direct a projection beam emitted from the projector to the screen from the rear of the display panel to form the image on the screen.

9 Claims, 8 Drawing Sheets

IMAGE DISPLAY DEVICE

BACKGROUND

Exemplary embodiments of the present invention relate to an image display device using a projector, which is suitable for displaying an advertisement, guide information, etc. at a store.

In department stores, supermarkets, general merchandise stores, etc., television-type image display devices have been widely used in place of posters, to introduce the stores or supermarkets or provide goods information to customers. Since these devices can repeatedly display various images as compared to the posters, by combining various moving images, an advertisement effect can be markedly enhanced. Therefore, the number of stores which adopt the image display devices gradually increases. These days, a large display device which displays an image on a screen using a liquid crystal projector has been developed. See related art documents Japanese Unexamined Patent Application Publication No. 9-154088 and Japanese Unexamined Patent Application Publication No. 2003-136892.

SUMMARY

However, the related art display devices encounter problems as described below.

By displaying various advertisement images on a large screen using a plasma display panel, since customers can recognize the advertisement images at a distance, an advertisement effect can be accomplished over a number of customers. Meanwhile, in the case that a plurality of tenants manage their respective stores on the same floor of a department store, each tenant must ceaselessly try to attract attention of customers walking on a passageway, to his or her store. Consequently, it is preferable to provide a display device which causes customers to drop in at the store and view not only an image appearing on the display device but also goods displayed in the store.

Accordingly, exemplary embodiments of the present invention have been made in order to address the above-mentioned requirements. Further, an object of exemplary embodiments of the present invention provide an image display device which is constructed to tempt a customer to approach the device and allow the customer to view an image in a standing posture. Another object of exemplary embodiments of the present invention is to provide an image display device which has a functional design and accomplishes high quality and marketability to attract customers' attention.

Exemplary embodiments of the present invention address or achieve the above objects by constructions described below.

Exemplary Embodiment 1. An independent installation type image display device includes a display panel having a transmissive screen which allows an image formed on one surface thereof to be viewed from the other surface thereof; a support frame to inclinedly support the display panel so that, when the image display device is erected on a substantially horizontal floor, an acute angle is defined between the display panel and the floor; a projector placed below the display panel to project an image on the screen of the display panel; a storage unit to store image data of an image to be projected, the storage unit being mounted to the projector to make the projector read the image data; and an optical mechanism to direct a projection beam emitted from the projector to the screen from the rear of the display panel to form the image on the screen.

The image display device is an independent installation type and can be provided at any place. Manipulation for transmitting image data from the outside through a network and the like to the image display device at a predetermined timing is not needed. Since image data is read out from the storage unit mounted to the projector, contents of the image data can be easily added and changed. Because the projector is placed below the display panel having the transmissive screen and the projection beam is directed to the screen from the rear of the display panel to form the image on the screen, a spatial requirement can be minimized, and the possibility of the projection beam to be blocked by an unpredicted obstacle can be reduced or eliminated. Due to the fact that the display panel is inclinedly supported, a customer can view the screen in a standing posture. Accordingly, because it is possible to attract customers' attention, the image display device according to exemplary embodiments of the present invention is suitable for advertisement.

Exemplary Embodiment 2. In the image display device according to Exemplary Embodiment 1, the angle defined between the display panel and the floor is set to 15° to 75°.

When the angle defined between the display panel and the floor is set to 15° to 75°, it is most appropriate for a customer to view the display panel in a standing posture without the need of taking an unnatural posture. Therefore, the image display device according to exemplary embodiments of the present invention can be most appropriately used to introduce a store or provide a goods advertisement to customers.

Exemplary Embodiment 3. In the image display device according to Exemplary Embodiment 1, the display panel includes a transparent panel to which the transmissive screen is attached; the support frame supports transparent edge portion of the transparent panel, so that, in a space which is defined by the support frame and through which the projection beam passes, at least a portion in the vicinity of the display panel can be viewed through in both directions except those a skeleton of the support frame; and the projector and the optical mechanism are received in a receiving case which is secured to the support frame below the transparent panel and has opaque side peripheral portion.

The projector received in the receiving case which has the opaque side peripheral portion cannot be easily perceived from the outside. Due to the fact that the support frame has the so-called skeleton structure, since an electric cord, etc. are not connected to the transmissive screen attached to the transparent panel, the transmissive screen is viewed as if it is suspended in midair. Also, because the projection beam is almost not viewed from the side, the screen on which an image is displayed and the transparent panel which supports the screen accomplish an excellent decoration effect. Also, excluding the receiving case which receives the projector, structures of constituent elements which constitute the image display device can be significantly simplified, whereby it is possible to reduce a weight of the image display device and save a manufacturing cost.

Exemplary Embodiment 4. In the image display device according to Exemplary Embodiment 1, when the space which is defined by the support frame and through which the projection beam passes is delimited only by column portions of the support frame, at least one guard member is provided on the support frame to traverse a space defined between the column portions of the support frame below the display panel.

When the space which is defined by the support frame and through which the projection beam passes is delimited only by the column portions of the support frame, the entire structure of the image display device can be significantly simplified while the functionality of the image display device is enhanced. However, in this situation, a foreign object or a human body may be easily placed in a path of the projection beam in such a way as to hinder the passage of the projection beam. Therefore, in exemplary embodiments of the present invention, at least one guard member is provided on the support frame. That is to say, since at least one guard member is provided to traverse the entirety or a part of the side peripheral surface of the column portions in a longitudinal or transverse direction, the space defined between the column portions of the support frame below the display panel can be completely or partly covered by the guard member, whereby it is possible to reduce or prevent a foreign object or a human body from being placed in the path of the projection beam. For example, since a child cannot place his or her eyes in the path of the projection beam, it is possible to reduce or prevent the child's eyes from being hurt by the projection beam.

Exemplary Embodiment 5. In the image display device according to Exemplary Embodiment 1, the projector is received in a receiving case which is secured to leg portions of the support frame, and the projection beam is emitted by the projector in a direction which extends from a lowermost position of the display panel toward an uppermost position of the display panel when viewed on the horizontal floor; and the optical mechanism reflects the projection beam toward the screen provided on the display panel.

By this feature of exemplary embodiments of the present invention, the projection beam emitted from the projector can reach the display panel after passing through a substantially 'L'-shaped path in the rear of the display panel.

It is to be readily understood that a sufficiently wide space cannot be defined below the display panel. In the case of projecting an image onto the screen by using the projector, the more a length of the projection beam increases, the more a size of an image projected onto the screen can be enlarged. In exemplary embodiments of the present invention, this requirement can be satisfied by the substantially 'L'-shaped path.

Exemplary Embodiment 6. In the image display device according to Exemplary Embodiment 1, the image display device further includes a support height adjustment mechanism of the display panel provided on the support frame; and the support height adjustment mechanism includes an interlocked mechanism for changing a support height of the support frame for the display panel and simultaneously changing a path of the projection beam which is defined by the optical mechanism.

While the structure of the support frame is simplified, it is possible to easily adjust the height the support frame. Since a projection angle of the projection beam can be changed at the same time the height of the support frame is adjusted, it is possible to reduce or prevent a position of an image projected onto the screen from being deviated.

Exemplary Embodiment 7. In the image display device according to Exemplary Embodiment 1, the image display device further includes a support angle adjustment mechanism provided on the support frame; and the support angle adjustment mechanism includes an interlocked mechanism to change a support angle of the support frame for the display panel and simultaneously changing a path which is defined by the optical mechanism and through which the projection beam passes.

While the structure of the support frame is simplified, it is possible to easily adjust a support angle of the support frame. Since a projection angle of the projection beam can be changed at the same time the support angle of the support frame is adjusted, it is possible to reduce or prevent a position of an image projected onto the screen from being deviated.

Exemplary Embodiment 8. In the image display device according to Exemplary Embodiment 1, the optical mechanism includes a plurality of reflection mirrors to divide the entirety or a part of the projection beam into a plurality of beam portions, so that one beam portion is directed to the screen of the display panel and the other at least one beam portion is directed to an auxiliary display panel which is secured to the support frame and has a transmissive screen arranged perpendicularly to the floor and having an image formed thereon.

On the display panel which is inclinedly held with respect to the floor, there are displayed contents to be viewed down in a standing posture. Meanwhile, another image is displayed on the auxiliary display panel which is perpendicular to the floor, to attract attention of customers walking on a passageway at a distance. At a distance, only the image displayed on the auxiliary display panel can be viewed. Since it is sufficient for the auxiliary display panel to attract customers' attention, only a part of the projection beam may be projected onto the screen of auxiliary display panel.

Exemplary Embodiment 9. In the image display device according to Exemplary Embodiment 1, a plurality of projectors and a plurality of display panels are secured to the support frame, and a plurality of optical mechanisms are provided to direct projection beams emitted from the respective projectors to corresponding display panels to thereby form images on the respective display panels.

By securing the plurality of display panels including the auxiliary display panel to the support frame, images can be displayed on screens of the display panels as the projection beams emitted from the projectors are projected onto the screens, respectively. A desired number of projectors can be mounted to the support frame. If all projectors are secured concentratedly to a lower part of the support frame, in the same manner as described above, a substantial part of the image display device can be constructed to be viewed through.

Exemplary Embodiment 10. An independent installation type image display device includes a display panel having a transmissive screen which allows an image formed on one surface thereof to be viewed from the other surface thereof; and a support frame for inclinedly supporting the display panel so that, when the image display device is erected on a horizontal floor, an acute angle is defined between the display panel and the floor. The support frame is structured to be capable of being moved on the floor, wherein a projection beam is emitted from a projector which is embedded in a pit directly below the floor, and is directed to the screen from the rear of the display panel to form the image on the screen.

By this feature of exemplary embodiments of the present invention, the display panel and the support frame can be moved on the floor. The projector and an optical mechanism are embedded in the pit directly below the floor. Therefore, in the entire image display device, since a proportion of a section which can be viewed through increases, an excellent decoration effect can be attained. Also, because the projector and the optical mechanism embedded in the pit directly below the floor are not moved when the display panel and the support frame are moved, the projector and the optical mechanism are not adversely influenced by vibration.

DETAILED DESCRIPTION OF EMBODIMENTS

An image display device according to exemplary embodiments of the present invention is suitable to be placed at a store of each tenant in a shopping center, a department store, a restaurant, a hotel, a commercial facility which is occupied by a plurality of tenants, etc. Images displayed on the image display device may be prepared by editing contents which introduce a store and goods, contents which are requested by a tenant, and so forth. The image display device according to exemplary embodiments of the present invention includes an independent installation type image display device and displays an image using a liquid crystal projector and the like. A screen on which an image is formed is integrated with a display panel. The display panel is supported on a support frame and inclinedly held with respect to a floor to have a predetermined inclination angle. In order to avoid a situation in which customers view the image display device and pass by the store at a distance, the image display device is designed so that an image cannot be properly viewed unless customers closely approach the image display device. The image display device as a whole can be moved to another place as occasion demands, like a stand.

FIRST EXEMPLARY EMBODIMENT

Figure 1:
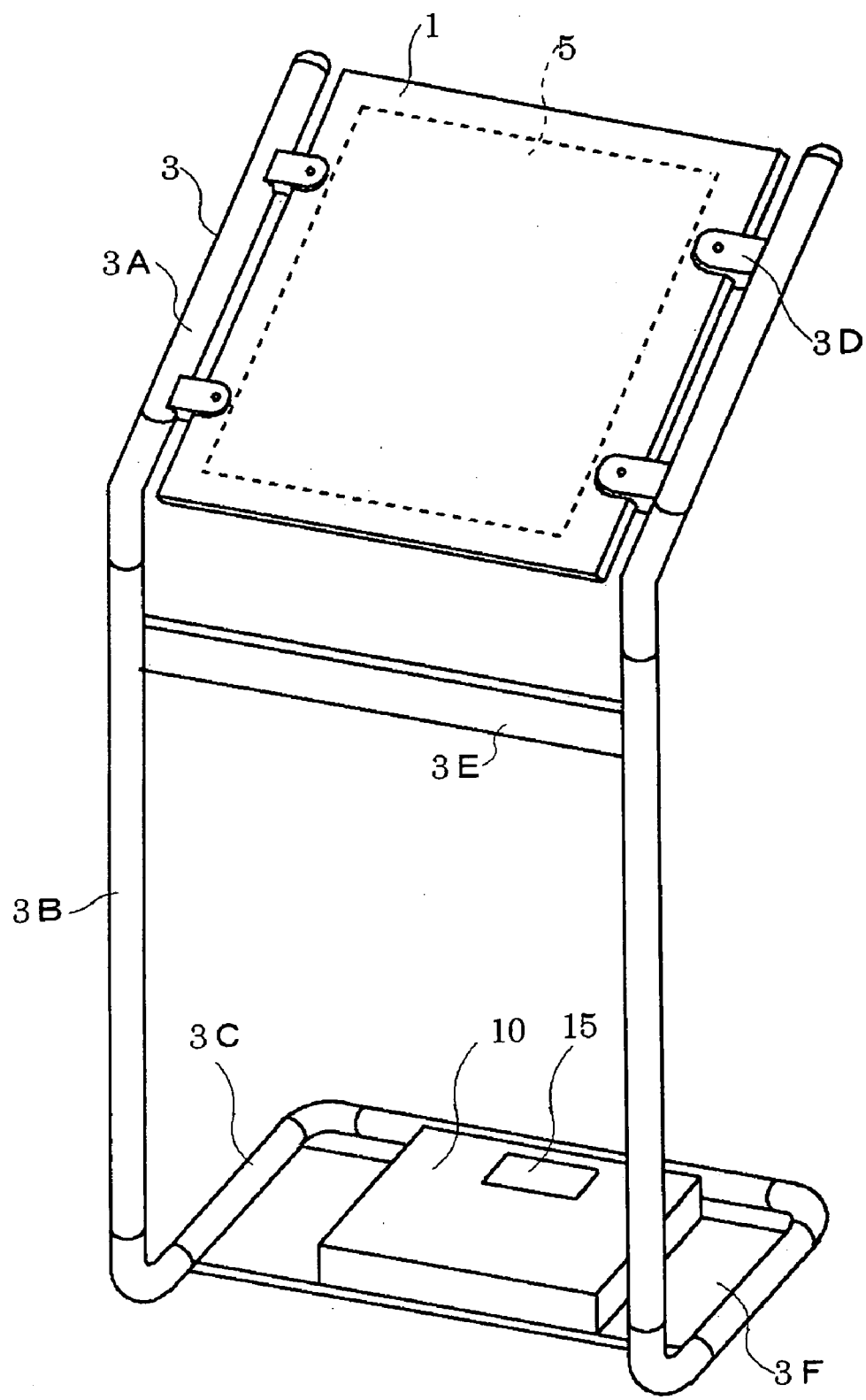
FIG. 1 is a schematic perspective view illustrating a construction of an image display device in accordance with a first exemplary embodiment of the present invention.

FIG. 1 is a perspective view illustrating a concrete example of an image display device according to exemplary embodiments of the present invention.

The image display device in accordance with a first exemplary embodiment of the present invention which is shown in FIG. 1 includes a display panel 1 to display an image, and a support frame 3 to support the display panel 1. For example, the display panel 1 is made of a transparent material such as acrylic resin. A screen 5 is attached to a lower, that is, rear surface of the display panel 1. The screen 5 may include a semi-transparent film or a portion of the rear surface of the display panel 1 which is provided in the form of a ground glass. A projection beam which is projected from a projector as will be described later in detail is formed as an image on the screen 5. Since the display panel 1 is made of a transparent material, the image formed on the screen 5 can be viewed from above with the display panel 1 held inclinedly.

The projector 11 (see FIG. 2) to emit a projection beam is received in a receiving case 10. The projection beam is projected onto the screen 5 after passing through a window 15 which is provided to the receiving case 10. The support frame 3 is formed of an aluminum pipe and the like. The support frame 3 includes inclined sections 3A, vertical sections 3B, horizontal sections 3C, arms 3D, and a base plate 3F. Four arms 3D project from side surfaces of the inclined sections 3A, and the display panel 1 is fastened to the arms 3D by screws. The arms 3D support a transparent edge portion of the display panel 1. Since the projection beam is almost not viewed from the side, the screen 5 is viewed as if it is suspended in midair, whereby an effect of attracting customer's attention is accomplished. A crossbar 3E functions to reinforce strength of the support frame 3. The base plate 3F is fastened to the horizontal sections 3C of the support frame 3 and functions to fixedly support the receiving case 10.

Figure 2:
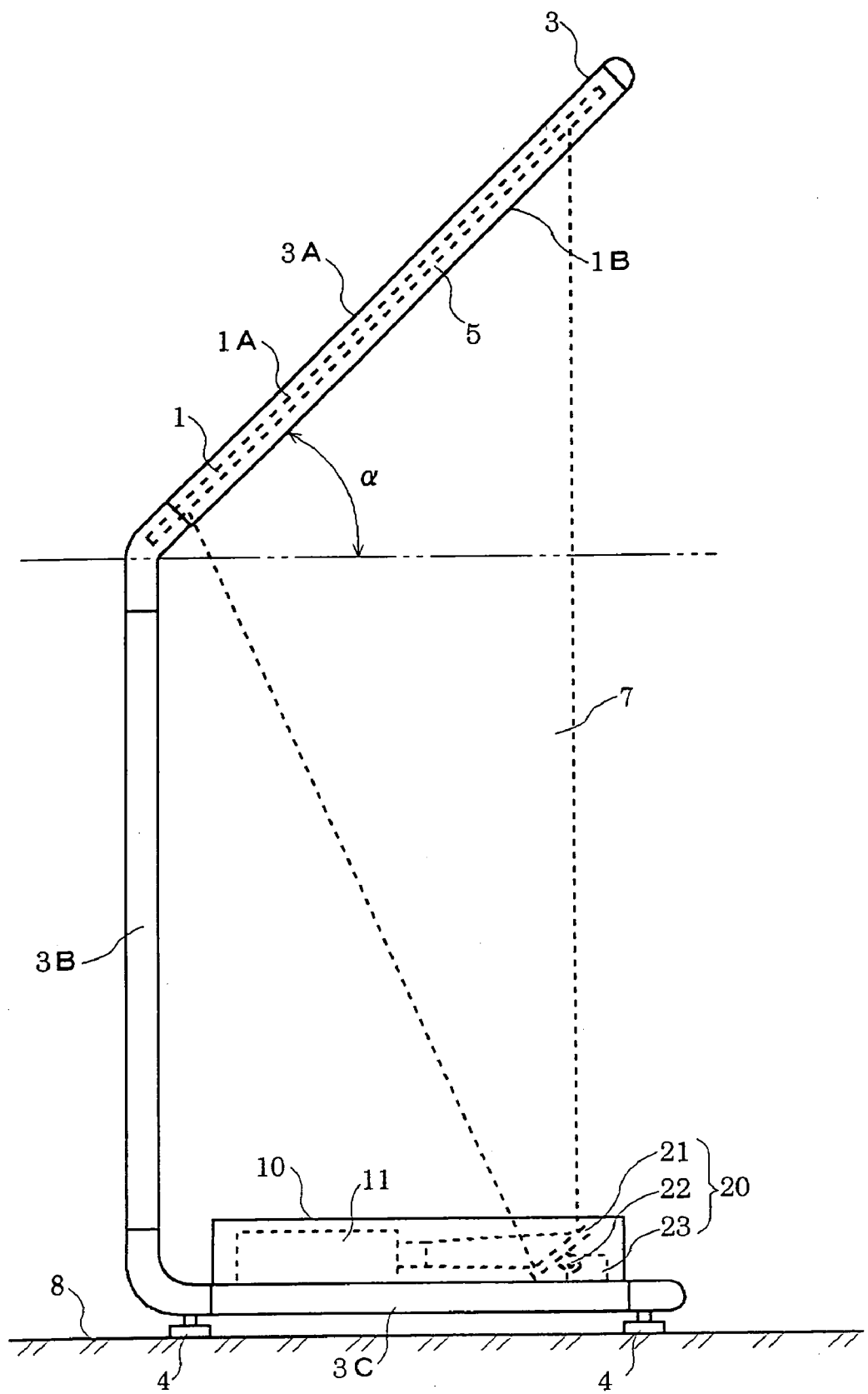
FIG. 2 is a schematic side view illustrating the construction of the image display device according to the first exemplary embodiment of the present invention.

FIG. 2 is a schematic side view illustrating the image display device.

As shown in FIG. 2, the support frame 3 is erected on the floor 8 by way of legs 4. Each leg element 4 has height adjusting threads. The inclined sections 3A of the support frame 3 are inclined to have a predetermined inclination angle α with respect to the horizontal floor 8. The related art projector 11 employing an LCD and the like is received in the receiving case 10. Additionally, an optical mechanism 20 is provided in the receiving case 10. The optical mechanism 20 reflects the projection beam 7 emitted by the projector 11 and directs the projection beam 7 toward the screen 5 of the display panel 1.

The optical mechanism 20 includes a reflection mirror 21, a bearing 22 and a support block 23. The reflection mirror 21 is fastened via the bearing 22 to the support block 23 in a manner such that an angle of the reflection mirror 21 can be adjusted. The bearing 22 has a structure which is similar to that of a universal joint. The bearing 22 has one end which is fastened to the support block 23 and the other end which can be freely rotated. The reflection mirror 21 is connected to the other end of the bearing 22. The projection beam 7 which is reflected by the reflection mirror 21 forms an image on the screen 5 which is provided on the rear surface 1B of the display panel 1. This image can be viewed on a front surface 1A of the display panel 1. In distances measured between various portions of the screen 5 and the reflection mirror 21, there necessarily exists irregularity. Therefore, if no measures are taken, an image formed on the screen 5 is distorted. This problem can be solved by a keystone correction technique that can be implemented by the related art projector 11.

As can be readily seen from the side view shown in FIG. 2, the projection beam 7 which is emitted from the projector 11 is directed from the left toward the right in FIG. 2. Specifically, when viewed on the floor 8, the projection beam 7 is directed from a point on the floor 8 which corresponds to the lowermost position of the display panel 1 toward a point on the floor 8 which corresponds to the uppermost position of the display panel 1, that is, toward the rear of the image display device. The projection beam 7 is reflected by the optical mechanism 20 in a direction which extends toward the screen 5 provided on the display panel 1. In this way, a projection distance of the projection beam 7 can be sufficiently lengthened.

Figure 3:
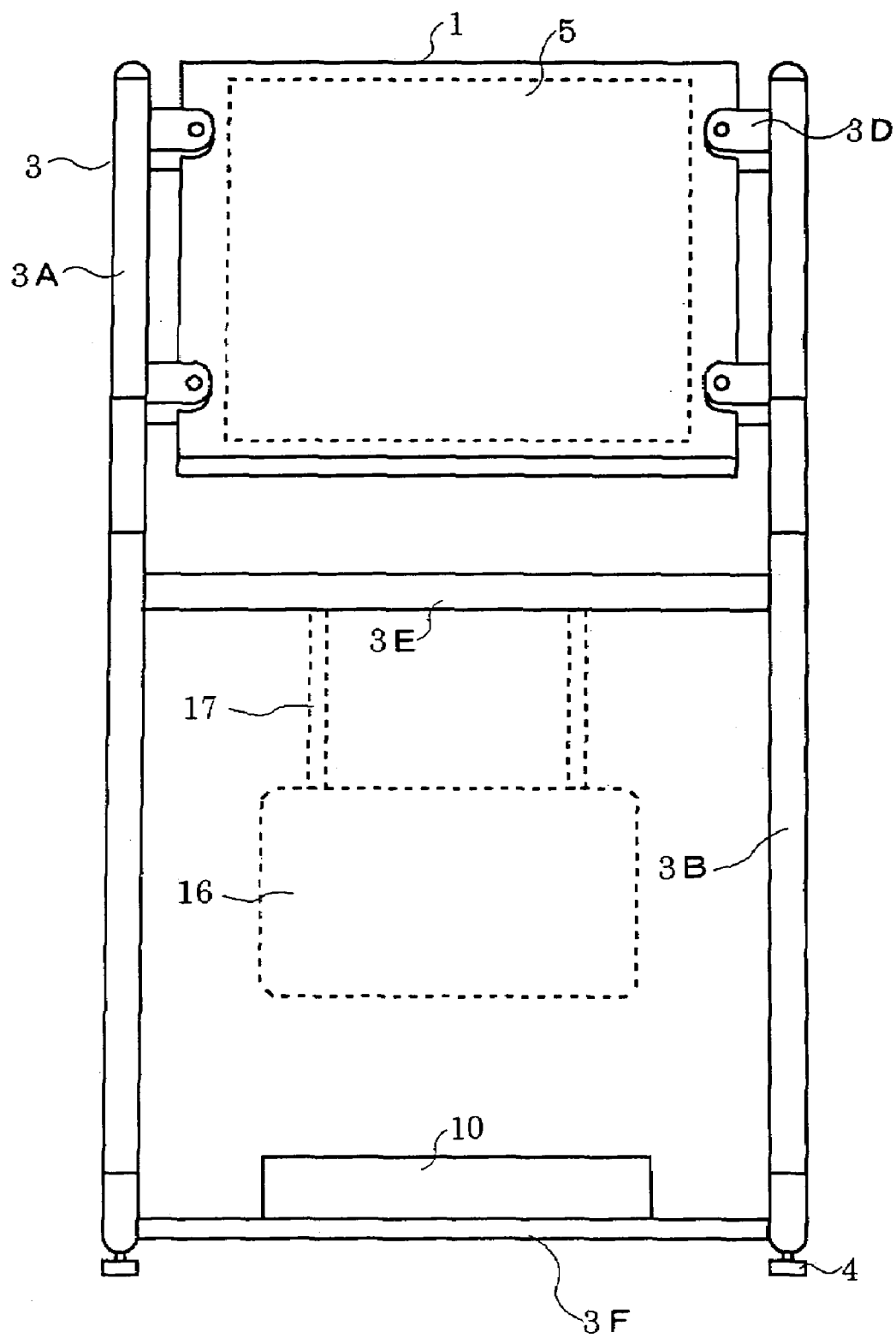
FIG. 3 is a schematic front view illustrating the construction of the image display device according to the first exemplary embodiment of the present invention.

FIG. 3 is a schematic front view of the image display device.

A customer can view the image formed on the screen 5 of the display panel 1 from the front of FIG. 3 in a standing posture. If the customer slightly recedes from the display panel 1, since external light is reflected by the front surface 1A of the display panel 1, it is difficult to properly view the image. Accordingly, the image display device according to exemplary embodiments of the present invention accomplishes an effect of attracting customers' attention because the customer must be positioned close to the display panel 1 to properly view the image. Referring to FIG. 3, the display panel 1 includes a transparent panel to which the transmissive screen 5 is attached, and the support frame 3 supports the transparent edge portion of the transparent panel. By this fact, the screen 5 is viewed as if it is suspended in midair. In this preferred exemplary embodiment, the at least a portion in the vicinity of the display panel 1 can be viewed through in both directions except a skeleton of the support frame. While the support frame 3 can have, for example, a box-shaped configuration, in consideration of aesthetics, it is preferred that the support frame 3 have a skeleton-like structure. Also, in consideration of aesthetics, it is preferred that the receiving case 10 to receive the projector 11 and the optical mechanism 20 includes, for example, a case which has opaque side peripheral portion. It is preferred that, in a space which is defined by the support frame 3 and through which the projection beam 7 passes, at least a portion in the vicinity of the display panel 1 can be viewed through in both directions, except the skeleton of the support frame.

When the space which is defined by the support frame 3 and through which the projection beam 7 passes is delimited only by column portions of the support frame 3, the entire structure of the image display device is made so simple that, for example, a hand can be placed in a path of the projection beam 7 to hinder the passage of the projection beam 7. Also, it can be envisaged that a child place his or her head in a path of the projection beam 7 and gazes the projection beam 7. In order to reduce or prevent these situations from occurring, a guard member, which is formed by suspending a protection plate 16 from the crossbar 3E using chains 17 as shown by broken lines in FIG. 3, may be provided. It is sufficient that the guard member traverse a space which is defined between the column portions of the support frame 3 below the display panel 1. Hence, due to the fact that the guard member is provided on the support frame 3 to extend in a longitudinal or transverse direction to cover completely or partly the space defined between the column portions of the support frame 3 below the display panel 1, it is possible to reduce or prevent a foreign object or a human body from being placed in the path of the projection beam 7.

Figure 4:
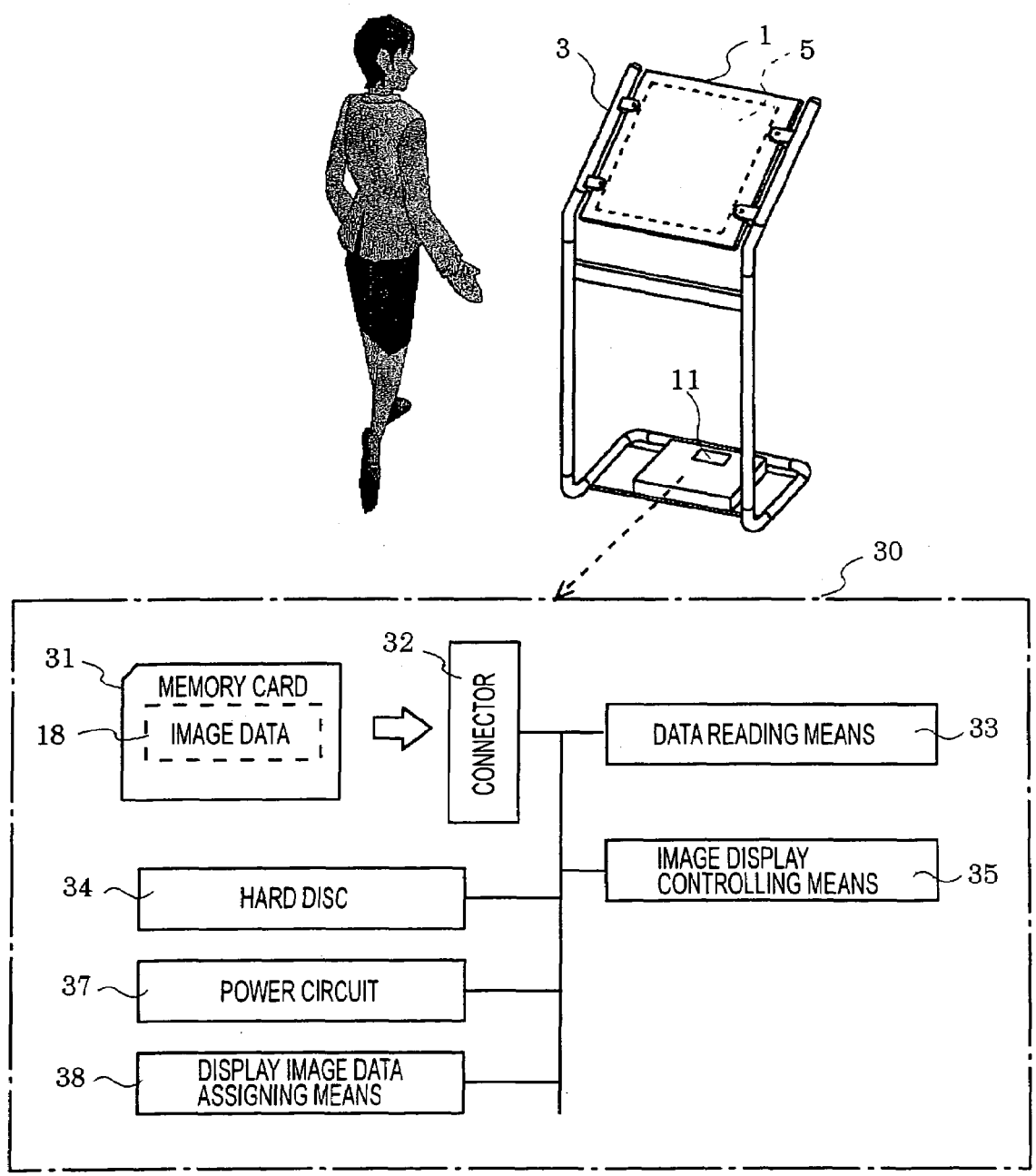
FIG. 4 is a schematic block diagram illustrating an internal circuit of a projector according to the first exemplary embodiment of the present invention.

FIG. 4 is a schematic block diagram illustrating an internal circuit of the projector in the image display device.

Referring to FIG. 4, the projector 11 has a circuit 30 which is designated by the one-dot chain line. The circuit 30 includes a connector 32, a data reading device 33, a hard disc 34, an image display controlling device 35, a power circuit 37, and a display image data assigning device 38.

A memory card 31 which includes, for example, a semiconductor memory is mounted to the connector 32. Image data 18 to be projected by the projector 11 are stored in the memory card 31.

If the memory card 31 is mounted to the connector 32, the image data 18 can be read out by the data reading device 33. The image data 18 is converted by the image display controlling device 35 into a picture image which can be projected by the projector 11. The data reading device 33 implements a data reading control task to transmit the image data 18 to the image display controlling device 35. The image display controlling device 35 includes an application program to control the projector 11 using the image data 18, for example, by operations through the slide show.

When a plurality of image data are stored in the memory card 31, the display image data assigning device 38 functions to select and assign which image data is to be assigned to the projector 11. The display image data assigning device 38 is provided on a housing of the projector 11 which is not shown. The power circuit 37 functions to supply driving power to the liquid crystal projector 11. The power circuit 37 may be connected to a normal power source or may include a battery. The hard disc 34 reads out and stores all image data stored in the memory card 31 and is used to make the projector 11 display the image data. The image display device according to exemplary embodiments of the present invention includes an independent installation type image display device. Necessary image data are stored in the memory card 31 or the hard disc 34. If the hard disc 34 can store a large quantity of image data, it is possible to store in the hard disc 34 image data for one week and to make the projector 11 display image data desired for each day using the display image data assigning device 38.

Various terminal devices which are connected to networks and controlled in their display images have been widely used. However, such terminal devices suffer from defects in that, since each of these terminal devices includes a large-sized system, a place for installing the terminal device cannot help but be limited, and the terminal device cannot be freely moved to another place. In the image display device according to exemplary embodiments of the present invention, since image data are stored in the memory card 31 mounted to the projector 11 or a storage unit such as the hard disc 34, and corresponding images are displayed on the screen 5 through projection, so long as power is supplied, the image display device can be located at any place and freely moved to another place. If the storage unit includes a storage medium which can be replaced in the projector 11, image data can be easily changed. While power supply is needed, if the projector 11 can accommodate a battery capable of supplying power for an extended period, it is not necessary to connect the projector 11 to an external power source. The image display device is used in a state in which it is erected on the horizontal floor 8. In another example, the image display device can be used in a state in which it is suspended upside down.

When the image display device is erected on the horizontal floor 8 as shown in FIG. 2, the projector 11 is positioned below the display panel 1. The optical mechanism 20, which is positioned below the display panel 1 and includes the reflecting mirror 21, etc., reflects the projection beam 7 emitted from the projector 11 toward the screen 5 of the display panel 1 to form an image on the screen 5. A path of the projection beam 7 is also defined below the display panel 1. The transmissive screen 5 is provided on the display panel 1, and the projected beam 7 is formed as an image on the lower, that is, the rear surface of the screen 5. By guarding the lower part of the image display device by the support frame 3 or additionally using the protection plate 16, the possibility for a customer to hinder the passage of the projection beam 7 is reduced or eliminated.

The related art includes independent installation type display devices which display recorded advertisement images on a television display. In such display devices, the television display window is vertically held. However, in the image display device according to exemplary embodiments of the present invention, when it is erected on the horizontal floor 8, the display panel 1 is inclinedly supported in a manner such that the rear surface 1B of the display panel 1 to which the screen 5 is attached faces downward. The inclination angle $\alpha$ between the rear surface 1B of the display panel 1 to which the screen 5 is attached and the floor 8 is set to an acute angle. Further, the support frame 3 supports the display panel 1 at a height which is lower than the eyes of an ordinary customer. Thus, in order to properly view an image displayed on the display panel 1, a customer must closely approach the display panel 1. By this fact, the image display device according to exemplary embodiments of the present invention accomplishes an effect of attracting customers' attention.

The inclination angle $\alpha$ of the display panel 1 is optimally determined in consideration of customer convenience when viewing the display panel 1 in the standing posture and an image forming condition in the keystone correction technique which is implemented when the projection beam 7 is projected onto the screen 5 to form an image. It is preferred that the inclination angle $\alpha$ of the display panel 1 be set to 15° to 75° which is most suitable for a customer to view the display panel 1 in the standing posture without the need of taking an unnatural posture. That is to say, the inclination angle is set to be suitable for displaying a store introducing image, a goods advertisement, etc. It is preferred that the height the display panel 1 be lower than the eyes of the ordinary customer when the customer stands in front of the display panel 1 and views the display panel 1. When assuming that the customer is an adult, it is preferred to consider the height a female who is generally shorter than a male. According to statistics of health submitted by the Ministry of Education, Culture, Sports, Science and Technology in Japan, an average height of Japanese females who are 17 years old approaches to about 157 centimeters for recent 10 years. Hence, if the uppermost end of the display panel 1 is positioned at a height which is greater than 160 centimeters, an average adult female cannot properly view the display panel in a normal standing posture. Accordingly, the height no greater than 157 centimeters can be considered practical. Further, when considering the fact that the display panel 1 can be easily viewed when the display panel 1 is positioned lower than the eyes of the customer, it is preferred that the display panel 1 have the height no greater than 140 centimeters. It is believed that a height, at which an adult female can properly view the display panel 1 without the need of taking an unnatural posture by bending her back, is about 30 centimeters below the height of the eyes. Therefore, the display panel 1 may have the height no less than 120 centimeters.

While the height the display panel 1 is determined in consideration of the height the average adult female as described above, an inclination angle of the display device 1 must also be appropriately adjusted. When a customer approaches and views the display panel 1 in the standing posture, if the display panel 1 is positioned lower than the eyes of the customer on a plane which is perpendicular to the floor 8, it is difficult to properly view the projected image. However, if the display panel 1 is inclined to have an inclination angle of 75°, the image can be easily viewed in the standing posture. Therefore, it is preferred that the inclination angle $\alpha$ is set to no greater than 75°. If the display panel 1 is held parallel to the horizontal floor 8, a customer standing in front of the display panel 1 must overly bend his or her back, and therefore, the customer must take an unnatural posture to properly view the image displayed on the screen 5. In this consideration, by inclining the display panel 1 by 15° with respect to the floor 8, it is possible to view the projected image without the need of taking an unnatural posture, by simply inclining the head and turning down the eyes while standing in front of the display panel 1.

Accordingly, it is believed preferable that an inclination angle of the display panel 1 is within a range of 15° to 75°. If groups of customers vary from place to place as in a tailor shop, a dress salon, a children's clothes store, a family restaurant, etc., a height and an inclination angle of the display panel 1 must be determined based on an average height of the eyes of customer groups. In the case that the image display device is received in a show window, and so on, a size of the image display device can be sufficiently reduced.

The image display device as described above can be suitably used, for example, in a tenant of a department store or in front of a store, to display a menu of a restaurant or a list of goods placed on sale. Further, for example, the image display device can be sufficiently reduced in its size to be exhibited on a show window along with other goods to thereby provide various goods information to the customers. The image display device according to exemplary embodiments of the present invention can be adapted for attracting customers' attention through a novel design and introducing goods information to the customers, rather than displaying information such as news intended to be conveyed to many and unspecified persons.

SECOND EXEMPLARY EMBODIMENT

FIGS. 5A-D are schematic explanatory views illustrating a support angle adjustment mechanism and a height adjustment mechanism in accordance with a second exemplary embodiment of the present invention.

Figure 5A:
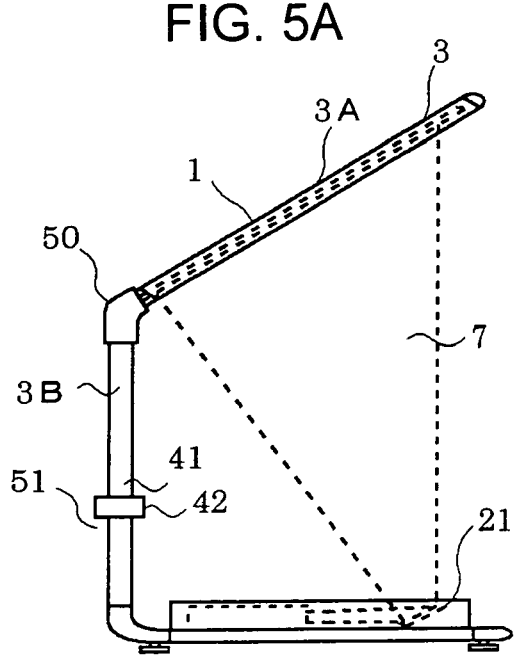
FIGS. 5A-D are schematic explanatory views illustrating a support angle adjustment mechanism and a height adjustment mechanism in accordance with a second exemplary embodiment of the present invention.

Depending upon an application of the image display device, it may be required to finely adjust a support angle of the support frame 3 for the display panel 1. Also, it may be required to finely adjust the height of the support frame 3. In order to satisfy these requirements, as shown in FIG. 5A, a support angle adjustment mechanism 50 structured similarly to a hinge mechanism and a height adjustment mechanism 51 structured similarly to a tripod of a camera, are provided on the vertical sections 3B of the support frame 3. If a support angle of the support frame 3 for the display panel 1 or the height the support frame 3 is adjusted, a positional deviation of the projection beam 7 on the screen 5 results. Accordingly, an appropriate mechanism is provided in a manner such that it is operated along with the support angle adjustment mechanism 50 and the height adjustment mechanism 51 in an interlocked manner to adjust an angle of the reflection mirror 21. Therefore, when implementing a support angle adjustment task or a height adjustment task, the positional deviation of an image displayed on the display panel 1 can be automatically adjusted. Of course, in order to optimize the formation of an image, it may be necessary to conduct a final fine adjustment task. Examples of the support angle adjustment mechanism and the height adjustment mechanism will be described with reference to FIGS. 5B-D.

Figure 5C:
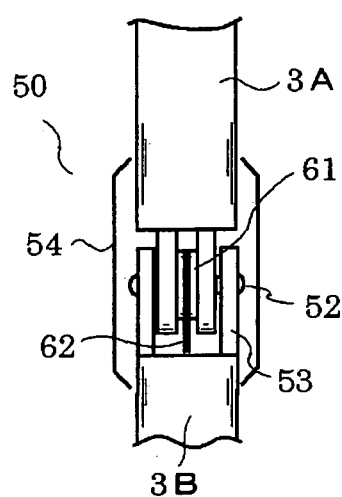
Figure 5B:
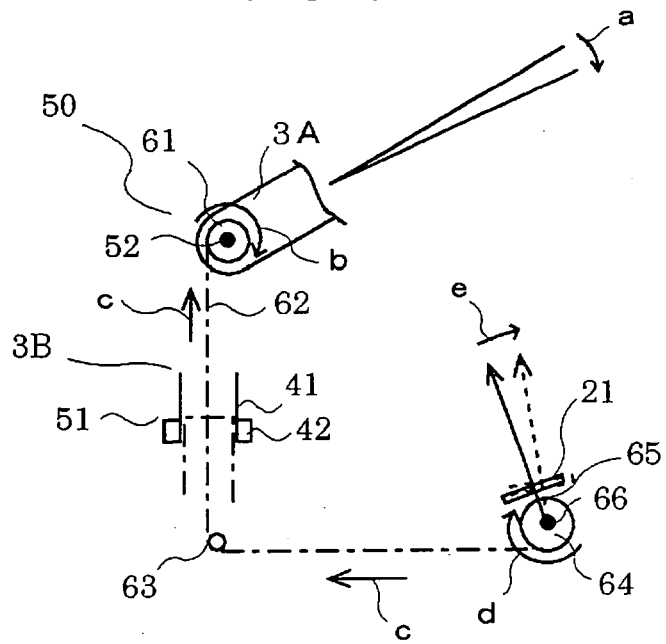
Figure 5D:
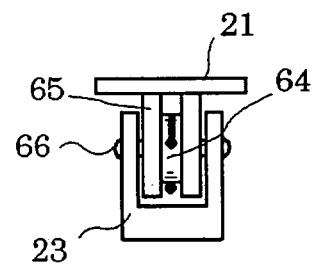

FIG. 5B is a schematic side view illustrating the mechanism interlocked with the support angle adjustment mechanism 50 and the height adjustment mechanism 51. FIG. 5C is a schematic front view illustrating a main part of the support angle adjustment mechanism 50. FIG. 5D is a schematic front view illustrating a main part of the reflection angle adjustment mechanism. As shown in these drawings, at a boundary region between the inclined sections 3A and the vertical sections 3B of the support frame 3, there is provided the support angle adjustment mechanism 50. Further, the height adjustment mechanism 51 is provided in at approximately the middle of the vertical section 3B. The support angle adjustment mechanism 50 has an angle detection drum 61. The angle detection drum 61 is secured to one end of the inclined section 3A. A rotation shaft 52 which passes through the center of the angle detection drum 61 is supported at the upper end of the vertical section 3B by bearings. The support angle adjustment mechanism 50 is covered by boot elements 54 which are made of rubber, etc. As shown in FIG. 5C, if a support angle of the inclined section 3A is changed about the rotation shaft 52, the angle detection drum 61 is rotated. The angle detection drum 61, a transmission wire 62, a guide roll 63, an angle establishment drum 64 and arms 65 constitute the interlocked mechanism.

The transmission wire 62 has one end wound on the angle detection drum 61. The transmission wire 62 reaches the angle establishment drum 64 via the guide roll 63. Referring to FIG. 5D, the transmission wire 62 has the other end wound on the angle establishment drum 64. The angle establishment drum 64 can be rotated about a rotation shaft 66 which is rotatably supported by the support block 23 of the optical mechanism 20. The angle establishment drum 64, the arms 65 and the reflection mirror are secured to one another to be integrally rotated about the rotation shaft 66.

Referring to FIG. 5B, if the inclination angle of the inclined sections 3A of the support frame 3 is changed in a direction indicated by the arrow 'a', the angle detection drum 61 is rotated in a direction indicated by the arrow 'b' and the transmission wire 62 is pulled in a direction indicated by the arrow 'c'. By this fact, as the angle establishment drum 64 is rotated in a direction indicated by the arrow 'd', the arms 65 changes an angle of the reflection mirror 21, and thereby an angle of the projection beam 7 is changed in a direction indicated by the arrow 'e'. In this way, if the inclination angle of the inclined sections 3A of the support frame 3 is changed, an angle of the reflection mirror 21 is automatically changed in an interlocked manner, so that the projection beam 7 can be projected to an appropriate position on the display panel 1.

In the height adjustment mechanism 51, as in the case of a threaded connection in a tripod of the camera, each of the vertical sections 3B of the support frame 3 are divided into two pipe elements such that one of the pipe elements is extendably fitted into the other of the pipe elements. The pipe elements comprise chuck pipes 41, and a lock nut 42 is provided at a connection region between the chuck pipes 41. By this configuration, it is possible to freely adjust the height of the support frame 3. If the support frame 3 is increased in its height, the transmission wire 62 is pulled in the direction indicated by the arrow 'c'.

Thereby, as in the case of adjusting the inclination angle of the inclined sections 3A, the angle establishment drum 64 is rotated to change an angle of the reflection mirror 21. Hence, when the height of the support frame 3 is changed, an angle of the projection beam 7 can be adjusted to be projected onto an appropriate position on the display panel 1. A person skilled in the art will readily recognize that the above construction is given for an illustrative purpose only and therefore other constructions for changing an angle of the reflection mirror 21 using other interlocked mechanisms can be provided. For example, it can be envisaged that an angle of the inclined sections 3A and the height the vertical sections 3B are detected using electrical sensors, and an angle of the reflection mirror 21 is automatically changed using a servo motor or a stepping motor.

THIRD EXEMPLARY EMBODIMENT

Figure 6A:
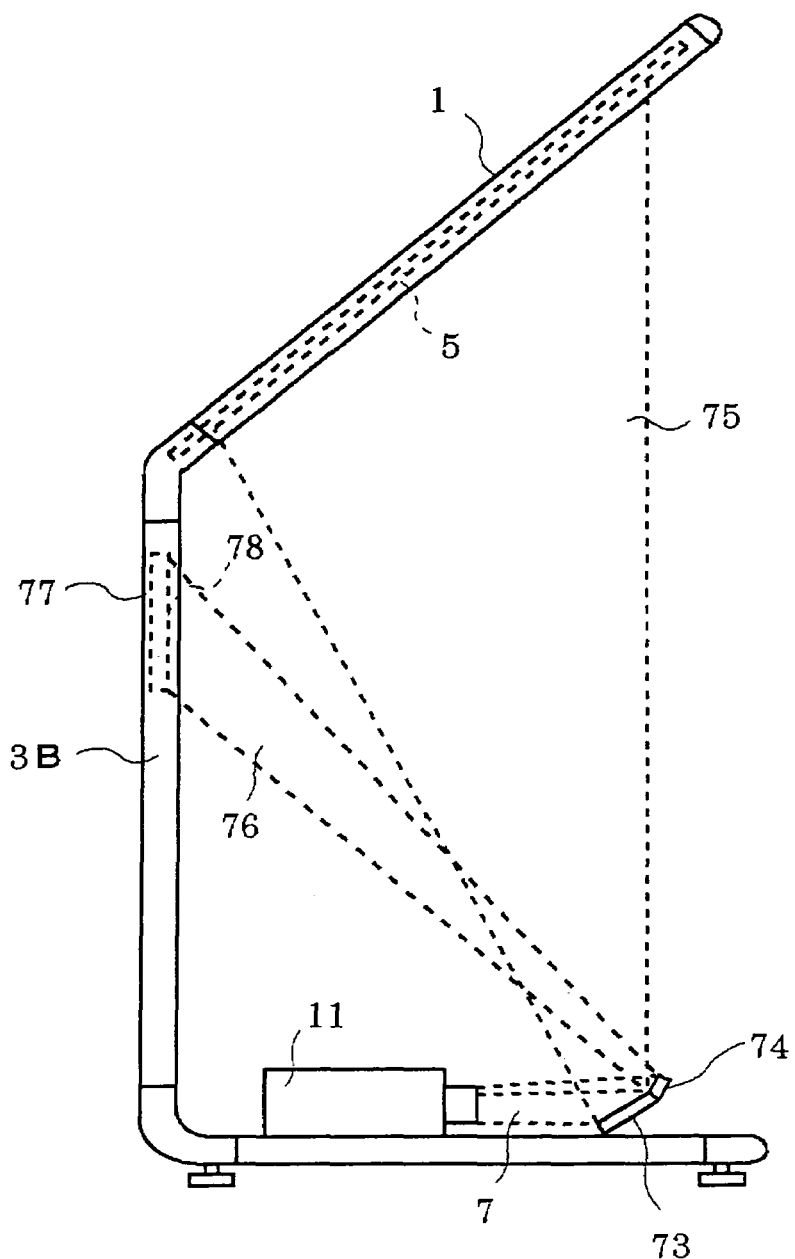
FIGS. 6A-C are schematics showing a construction of an image display device in accordance with a third exemplary embodiment of the present invention.
Figure 6B:
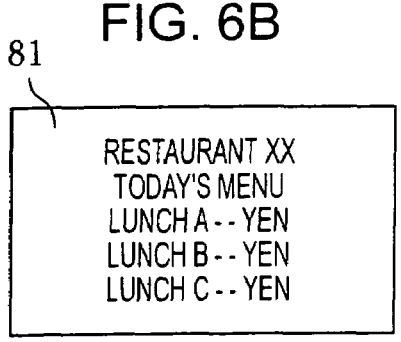
Figure 6C:

FIGS. 6A-C are schematic views illustrating a construction of an image display device in accordance with a third exemplary embodiment of the present invention.

As can be readily understood from the above description, in FIG. 6, a projection beam 75 is reflected by a main reflection mirror 73, projected onto the screen 5 of the display panel 1, and formed as an image. In this exemplary embodiment, an auxiliary reflection mirror 74 is provided adjacent to the main reflection mirror 73. Further, an auxiliary display panel 77 and an auxiliary screen 78 are provided on the vertical sections 3B of the support frame 3. The main reflection mirror 73 and the auxiliary reflection mirror 74 divide the projection beam 7 emitted from the projector 11 into two projection beam portions 75 and 76. The main projection beam 75 is projected onto the screen 5 of the display panel 1 and formed as an image, and the auxiliary projection beam 76 is projected onto the auxiliary screen 78 of the auxiliary display panel 77 and formed as an image.

FIG. 6B illustrates an example of an image 81 displayed on the display panel 1, and FIG. 6C illustrates an example of an image 82 displayed on the auxiliary display panel 77. As can be readily seen from these drawings, by separately displaying images 81 and 82 on the display panel 1 and the auxiliary display panel 77, due to the presence of the auxiliary display panel 77, even the customers who are distant from the image display device can recognize that something is displayed on the display image device. The image displayed on the display panel 1 cannot be properly viewed unless the customers closely approach the image display device. Therefore, the auxiliary display panel 77 functions to attract attention of customers who walk at a distance. In the case of the other exemplary embodiments, on the display device 1, there can also be displayed letters, figures, still pictures, moving pictures, or optional image data. Also, an audio system can be provided to the image display device along with the projector or in a state in which the audio system is built in the projector. By this fact, the image display device according to exemplary embodiments of the present invention can attract customers' attention using a combination of image and sound.

FOURTH EXEMPLARY EMBODIMENT

Figure 7A:
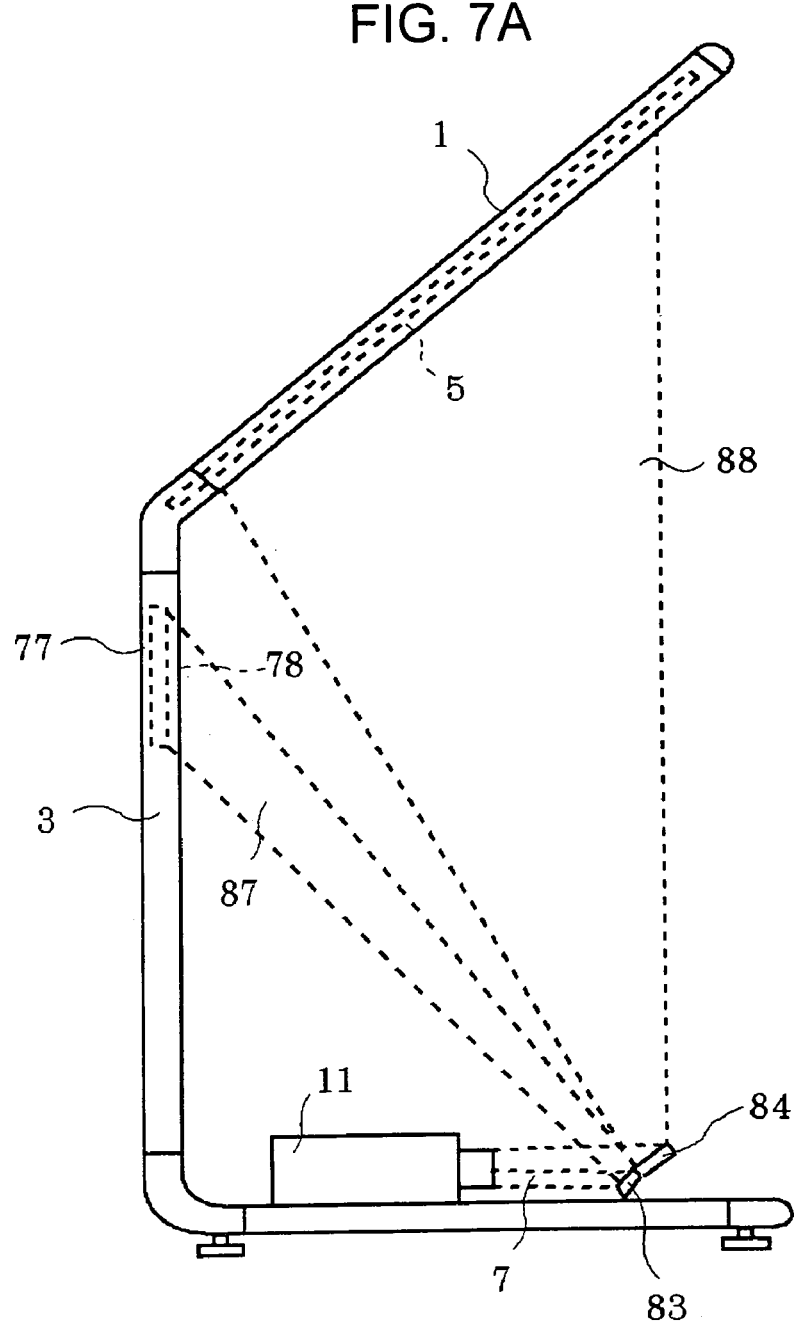
FIGS. 7A-B are side views illustrating a construction of an image display device in accordance with a fourth exemplary embodiment of the present invention.
Figure 7B:
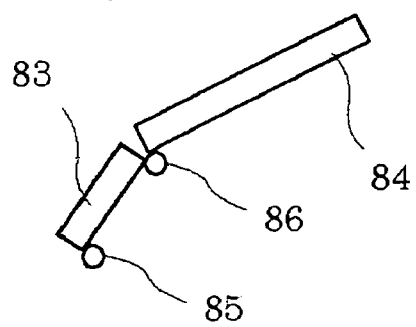

FIGS. 7A-B are side views illustrating a construction of an image display device in accordance with a fourth exemplary embodiment of the present invention.

In this exemplary embodiment, as shown in FIG. 7A, positions of a main reflection mirror 84 and an auxiliary reflection mirror 83 are reversed from those of the main reflection mirror 73 and the auxiliary reflection mirror 74 of the third exemplary embodiment shown in FIG. 6. A position of an auxiliary display panel 77 is the same as that of the exemplary embodiment shown in FIG. 6. The main reflection mirror 84 and the auxiliary reflection mirror 83 divide the projection beam 7 emitted from the projector 11 into two projection beam portions 88 and 87. The main projection beam 88 is projected onto the screen 5 of the display panel 1 and formed as an image, and the auxiliary projection beam 87 is projected onto the auxiliary screen 78 of the auxiliary display panel 77 and formed as an image. Also, as shown in FIG. 7B, a lower end of the auxiliary reflection mirror 83 is supported by the support frame 3 by way of a hinge 85. The main reflection mirror 84 is supported by an upper end of the auxiliary reflection mirror 83 by way of a hinge 86. Using these hinges 85 and 86, inclination of the main reflection mirror 84 and the auxiliary reflection mirror 83 can be optimized.

FIFTH EXEMPLARY EMBODIMENT

Figure 8A:
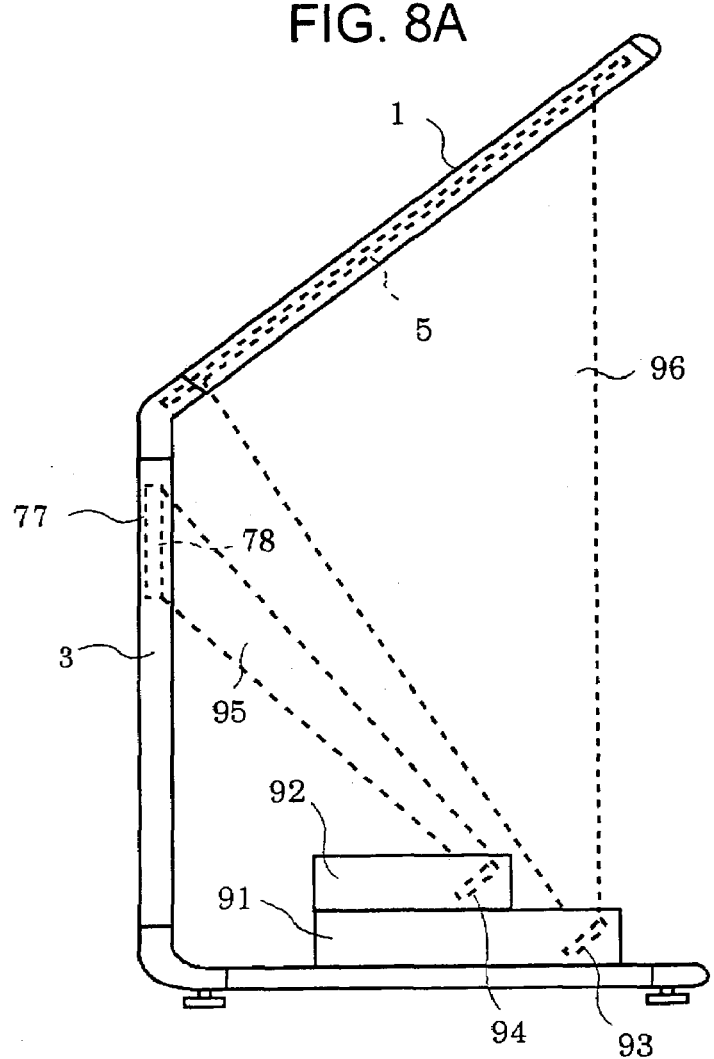
FIG. 8A is a schematic side view illustrating a construction of an image display device in accordance with a fifth exemplary embodiment of the present invention.
Figure 8B:
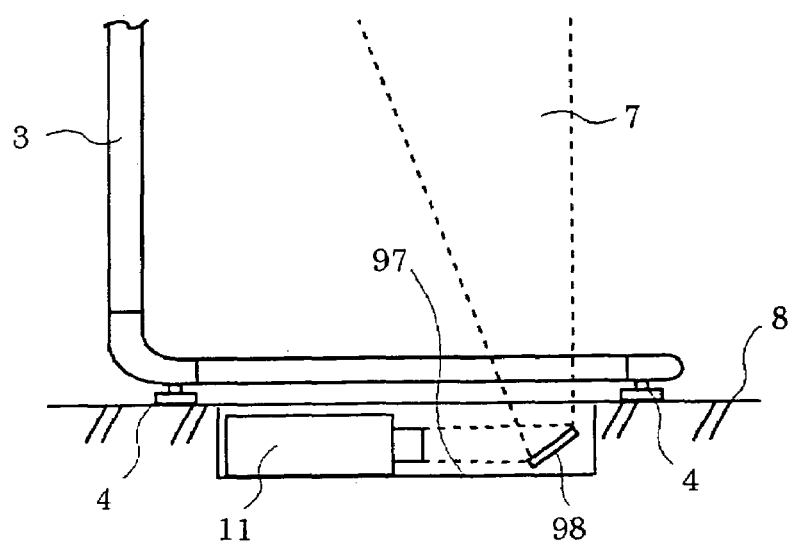
FIG. 8B is a schematic side view illustrating a construction of an image display device in accordance with a sixth exemplary embodiment of the present invention.

FIG. 8A is a schematic side view illustrating an image display device in accordance with a fifth exemplary embodiment of the present invention. FIG. 8B is a schematic side view illustrating an image display device in accordance with a sixth exemplary embodiment of the present invention.

In FIG. 8A, a plurality of (in this exemplary embodiment, two) projectors 91 and 92 can be securely supported by the support frame 3. Also, a plurality of (in this exemplary embodiment, two) display panels 1 and 77 can be fastened to the support frame 3. Optical mechanisms 93 and 94 are respectively assembled into the projectors 91 and 92. These respective constituent elements function in the same manner as described above. A projection beam 96 emitted by the projector 91 is reflected by the optical mechanism 93 and then projected onto the screen 5 of the display panel 1 and formed as an image. A projection beam 95 emitted by the projector 92 is guided by the optical mechanism 94 and then projected onto the auxiliary screen 78 of the auxiliary display panel 77 and formed as an image. By causing the projection beams emitted from the respective projectors to be directed onto the respective screens of the display panels, it is possible to freely display desired images on the respective display panels. The number of projectors that are fixed to the support frame 3 can be optionally selected. Positions where the display panels are secured to the support frame 3 can also be optionally selected. In this regard, by concentratedly securing all the projectors to the lower part of the support frame 3, advantages can be provided in view of aesthetics and convenience when replacing the storage unit with a new one.

SIXTH EXEMPLARY EMBODIMENT

In FIG. 8B, the projector is not mounted to the support frame 3. While the upper part of the support frame 3 is not shown in FIG. 8B, it is constructed in the same manner as the first exemplary embodiment. While the legs 4 are illustrated in the same manner as the first exemplary embodiment, by constituting the legs 4 using casters, the support frame 3 can be moved on the floor 8 as occasion demands. Therefore, since the projector and optical mechanism are not secured to the support frame 3, a weight of the support frame 3 including constituent elements secured thereto can be significantly reduced and therefore can be easily moved. A pit 97 is defined on the floor 8, and the projector 11 and optical mechanism 98 are embedded in the pit 97. The projector 11 which is embedded in the pit 97 directly below the display panel 1 can emit the projection beam 7 to project an image onto the screen of the display panel. If the support frame 3 is moved to another place, it is preferred to close an upper end of the pit 97 using a cover member to protect the projector 11. Additionally, in this exemplary embodiment, a plurality of projectors or a plurality of optical mechanisms can be used to project images on a plurality of display panels. The projector 11 embedded in the pit 97 can be removed from the pit 97 and detachably secured to the support frame 3 using an appropriate mechanism.

What is claimed is:

1. An independent installation type image display device, comprising:
   a display panel having a transmissive screen which allows an image formed on one surface of the transmissive screen to be viewed from an other surface of the transmissive screen;
   a support frame to inclinedly support the display panel so that, when the image display device is erected on a substantially horizontal floor, an acute angle is defined between the display panel and the floor;
   a projector placed below the display panel to project an image on the screen of the display panel;
   a storage unit to store image data of an image to be projected, the storage unit being mounted to the projector to make the projector read the image data; and
   an optical mechanism to direct a projection beam emitted from the projector to the screen from a rear of the display panel to form the image on the screen, wherein the optical mechanism includes a plurality of reflection mirrors to divide an entirety or a part of the projection beam into a plurality of beam portions, so that one beam portion is directed to the screen of the display panel and the other at least one beam portion is directed to an auxiliary display panel which is secured to the support frame and has a transmissive screen arranged perpendicularly to the floor and having an image formed thereon.

2. The image display device according to claim 1, the angle defined between the display panel and the floor being set to 15° to 75°.

3. The image display device according to claim 1, the display panel including a transparent panel to which the transmissive screen is attached;
   the support frame supporting a transparent edge portion of the transparent panel, so that, in a space which is defined by the support frame and through which the projection beam passes, at least a portion in a vicinity of the display panel can be viewed through in both directions except a skeleton of the support frame; and
   the projector and the optical mechanism being received in a receiving case which is secured to the support frame below the transparent panel and having opaque side peripheral portions.

4. The image display device according to claim 1, when a space which is defined by the support frame and through which the projection beam passes is delimited only by column portions of the support frame, at least one guard member being provided on the support frame to traverse the space defined between the column portions of the support frame below the display panel.

5. The image display device according to claim 1, the projector being received in a receiving case which is secured to leg portions of the support frame, and the projection beam being emitted by the projector in a direction which extends from a lowermost position of the display panel toward an uppermost position of the display panel when viewed on the substantially horizontal floor; and
   the optical mechanism reflecting the projection beam toward the screen provided on the display panel.

6. The image display device according to claim 1, further comprising a support height adjustment mechanism for the display panel provided on the support frame, the support height adjustment mechanism including an interlocking mechanism to change a support height of the support frame for the display panel and simultaneously change a path of the projection beam which is defined by the optical mechanism.

7. The image display device according to claim 1, further comprising a support angle adjustment mechanism provided on the support frame, the support angle adjustment mechanism including an interlocking mechanism to change a support angle of the support frame for the display panel and simultaneously change a path which is defined by the optical mechanism and through which the projection beam passes.

8. The image display device according to claim 1, a plurality of projectors and a plurality of display panels being secured to the support frame, and a plurality of optical mechanisms are provided to direct projection beams emitted from the respective projectors to corresponding display panels to thereby form images on the respective display panels.

9. An independent installation type image display device, comprising:

a display panel having a transmissive screen which allows an image formed on one surface of the transmissive screen to be viewed from an other surface of the transmissive screen; and a support frame to inclinedly support the display panel so that, when the image display device is erected on a substantially horizontal floor, an acute angle is defined between the display panel and the floor, the support frame being structured to be capable of being moved on the floor, a projection beam being emitted from a projector which is embedded in a pit directly below the floor, and is directed to the screen from a rear of the display panel to form the image on the screen.

* * * * *